C. B. & S. W. EMERY.
Anti-Friction Device for Car-wheels.

No. 159,656. Patented Feb. 9, 1875.

UNITED STATES PATENT OFFICE.

CHARLES B. EMERY, OF BOSTON, MASSACHUSETTS, AND SAMUEL W. EMERY, OF PORTLAND, MAINE.

IMPROVEMENT IN ANTI-FRICTION DEVICES FOR CAR-WHEELS.

Specification forming part of Letters Patent No. 159,656, dated February 9, 1875; application filed December 11, 1874.

*To all whom it may concern:*

Be it known that we, CHARLES B. EMERY, of Boston, in the county of Suffolk and Commonwealth of Massachusetts, and SAMUEL W. EMERY, of Portland, in the State of Maine, have invented an Anti-Friction Device for Railway-Car Wheels, of which the following is a specification:

The invention relates to secondary wheels, acting in combination with, and operating upon, the extremities of car-axles and their supporting-wheels, for the purpose of saving friction, and of diminishing heat in the journal-boxes. Said secondary wheels are short hollow cylinders, open at one end, and the closed end is concave toward the supporting or car wheel, the cylinder being but a rim or flange projecting from the periphery of the said wheel toward the supporting-wheel, so that the rim of the secondary wheel rests upon the end of the supporting-wheel axle. Said secondary wheels, revolving upon independent axles, are joined to the truck-frames or suitable supports by housings having journals and other necessary supports or devices for operating the invention.

When the car, which rests upon the truck-frame, and the truck-frame upon the secondary wheels, is set in motion, the revolution of the secondary wheels causes the car or supporting wheels to revolve—that is, motion is first communicated to the secondary wheels, which, in turn, communicate motion to the car or supporting wheels.

The object of the invention is to increase the leverage over the friction, and, to a certain degree, prevent the journal-boxes from becoming heated.

Figure 1:
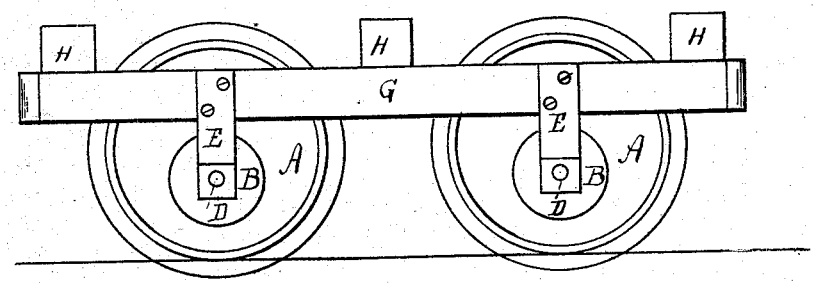
Figures 2, 3:
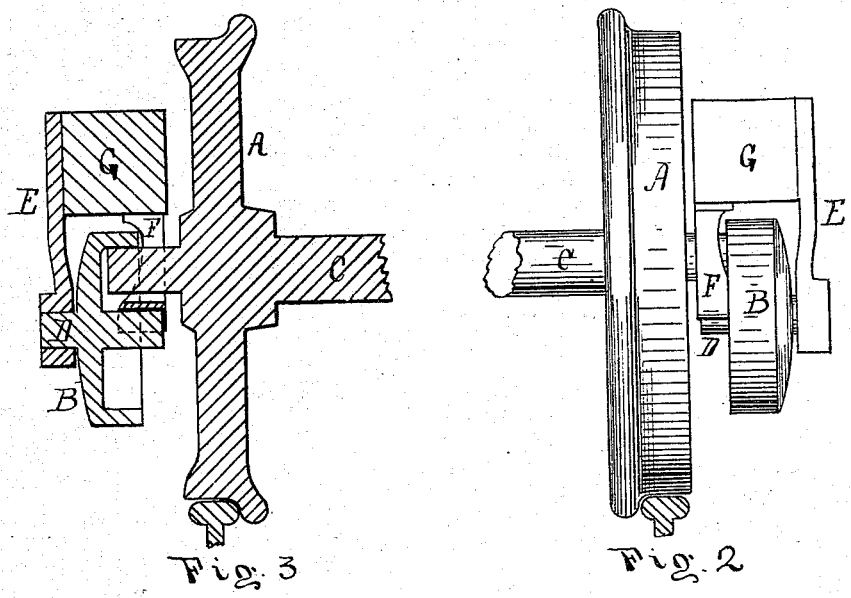

Figure 1 in the drawings is a side elevation of the invention, showing a car-truck frame, G, with its cross-beams H H, &c., the car-wheels A A, the secondary wheels B B, and the outside housings and journals E E. Fig. 2 is a front elevation of a car-wheel, A, its axle C, the secondary wheel B, its axle D, its outer and inner housings E F, and the end of the sill of the truck-frame G. Fig. 3 is a vertical section of Fig. 2, showing the car-wheel A and its axle C extending through the wheel into the secondary wheel B, whose flange or rim rests, by its upper part, upon the end of the car-axle. It will be observed, also, that the axle D of the wheel B is inclosed by, and rests upon, the housing and journal E on its outer side, and presses up against the journal and stay F on the inner side, and said housings, journals, and stays E and F are fastened to, and hold up, the truck-frame sill G. The weight of the car, of course, rests upon the truck. When, therefore, the car is set in motion, or pulled in either direction, its weight bears upon the secondary wheels, causing them to revolve on their axles, which revolution acts, by the rims of said secondary wheels, upon the ends of the axles of the supporting-wheels, and, in this way, the motion of the car-body, acting upon the secondary wheels, sets in motion the supporting or car wheels. The inner surface of the rim of the secondary wheel, where the bearing is upon the end of the car-axle, and the car-axle itself, as represented in the drawings, is smooth and cylindrical, but both car-axle C and the rim of the secondary wheel B may have their corresponding surface-bearings in furrows and ridges, the one fitting the other; and, since the inner surface of the rim of the secondary wheel bears upon the top of the car-axle, there will be little tendency to wear the axle, the bearing being broad. Any suitable stays may be used in attaching the secondary wheels to the truck-frame; also, housings, and journal-boxes, and coverings to protect the mechanism from dust. The inner journal-box is contained mostly between the sides of the projecting rim, thus allowing the secondary wheel to come much nearer to the car-wheel, and, in this way, prevent the leverage from breaking the car-axle. A half-box, also, may be used, being a part of, or attached to, the inside journal-box, and which may be extended part way around the car-axle, and still not touch it, except when the car-axle is thrown out of line of perpendicular in going around a curve, or up a grade, or when the brakes are applied.

It should be observed, also, that this described arrangement of the secondary wheel with respect to the supporting-wheel places the supporting-point of the center of motion below the center of support, and that the difference is the distance from the top of the car-axle C to the center of the axle D of the secondary wheel, and that the rim of the secondary wheel acts like a hook, hanging the body of the car upon the axles of the supporting-wheels. Lowering the center of motion below the center of support makes the car-body steadier in motion, and less liable to be upset. This improvement in railway-cars is novel.

We are aware that friction-wheels in which the axles of the principal wheels rest upon the flanges of said friction-wheels have heretofore been patented. In such cases the propelling power is applied to the principal wheels directly. Our invention differs from that essentially in the following particulars: First, the power is transmitted to the principal wheels through the intervention of the secondary or friction wheels; second, the friction-wheels rest upon the axles of the principal wheels; third, in consequence of such position, the friction is transferred from the axles of the secondary to the principal wheels; fourth, the combinations of axles, boxes, &c., herein presented are different from those in the patent referred to, and show particular invention.

We claim—

1. The combination of the truck-frame G, housings and stays E and F, axle D, secondary wheel, B, axle C, and supporting-wheel A, substantially as and for the purpose set forth.

2. The wheel B, to revolve upon an independent axle, D, said axle being supported by suitable pedestals to a frame, G, combined with axle C and supporting-wheel A, substantially as and for the purpose set forth.

3. The combination of the journal of the supporting-wheel A with hollow friction-wheel B, the spindles of which are vertically below the said journal of the supporting-wheel, the pedestal E F, and truck-frame G, the flange of wheel B resting on the journal of wheel A, substantially as and for the purpose set forth.

CHARLES B. EMERY.
SAMUEL W. EMERY.

Witnesses:
FRANK G. PARKER,
J. L. NEWTON.